(12) United States Patent
Normand

(10) Patent No.: US 9,519,962 B1
(45) Date of Patent: Dec. 13, 2016

(54) CIGAR IDENTIFICATION PROCESS OVER A COMMUNICATIONS NETWORK

(71) Applicant: The Cigar Lab Co., Miami, FL (US)

(72) Inventor: Christophe Normand, Miami, FL (US)

(73) Assignee: The Cigar Lab Co., Miami, FL (US)

( * ) Notice: Subject to any disclaimer, the term of this patent is extended or adjusted under 35 U.S.C. 154(b) by 0 days.

(21) Appl. No.: 14/990,447

(22) Filed: Jan. 7, 2016

(51) Int. Cl.
*G06K 9/46* (2006.01)
*G06T 7/00* (2006.01)
*A24F 13/00* (2006.01)
*G06K 9/62* (2006.01)
*G06F 17/30* (2006.01)

(52) U.S. Cl.
CPC ............. *G06T 7/0004* (2013.01); *A24F 13/00* (2013.01); *G06F 17/3028* (2013.01); *G06F 17/30256* (2013.01); *G06F 17/30867* (2013.01); *G06K 9/4604* (2013.01); *G06K 9/6202* (2013.01)

(58) Field of Classification Search
None
See application file for complete search history.

(56) References Cited

U.S. PATENT DOCUMENTS

| | | | | |
|---|---|---|---|---|
| 3,373,870 A | * | 3/1968 | Black | B07C 5/342 209/565 |
| 6,744,938 B1 | * | 6/2004 | Rantze | G06K 9/00 382/312 |

* cited by examiner

*Primary Examiner* — Mark Roz
(74) *Attorney, Agent, or Firm* — Mark Terry

(57) ABSTRACT

A method on a computer for facilitating identification of a cigar is provided. The server is configured for: storing cigar records and user records, reading an image of a particular cigar from the user, and calculating a number of cigar bands in the image, a cigar band location for each cigar band and a separate cigar band image for each cigar band in the image. Next, data calculated above from the image of the particular cigar is compared to the data in the cigar records, so as to find a match between data of the particular cigar and data in a matching cigar record, and reading the cigar brand from the matching cigar record, so as to identify a cigar brand of the particular cigar.

14 Claims, 10 Drawing Sheets

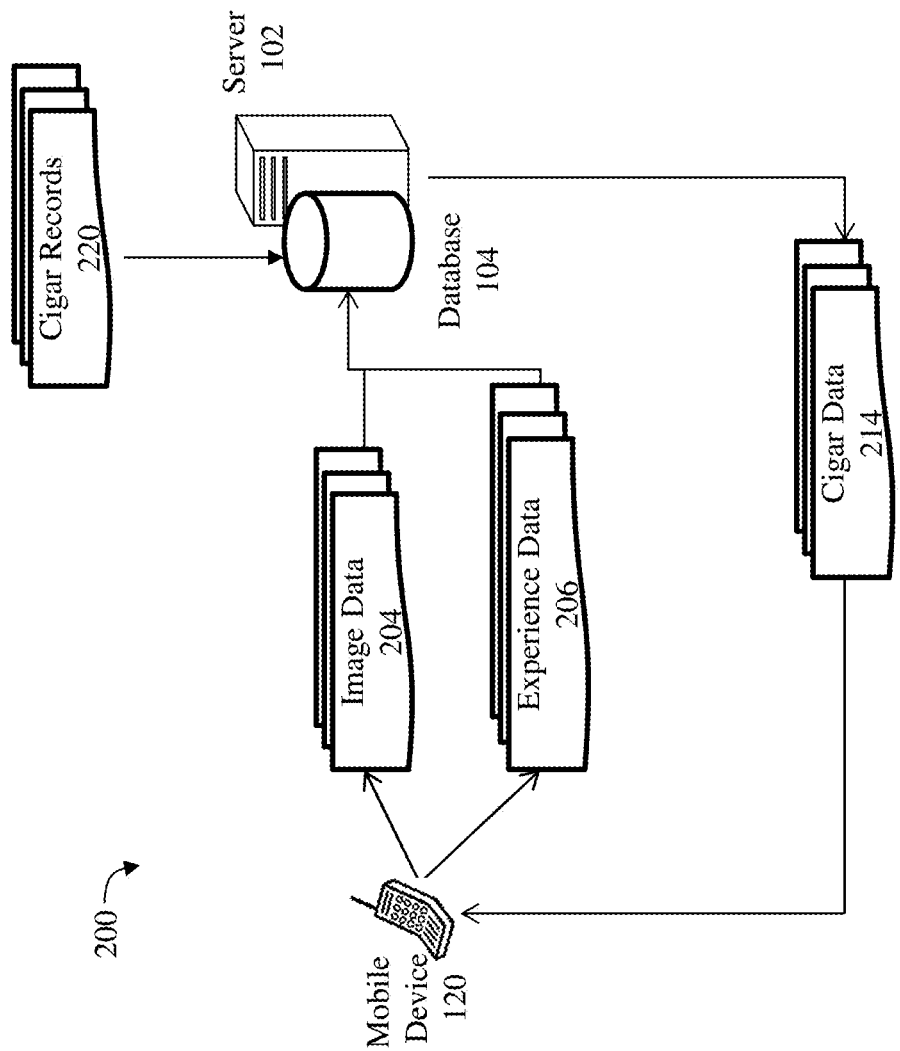

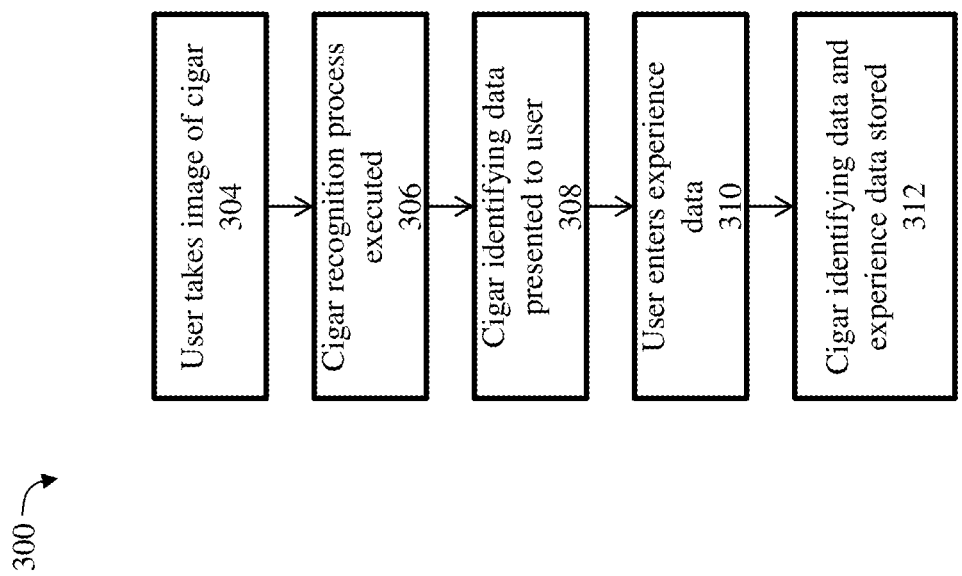

CIGAR IDENTIFICATION PROCESS OVER A COMMUNICATIONS NETWORK

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the field of image recognition and, more specifically, to processes for facilitating image recognition of cigars over telecommunications networks.

BACKGROUND

The cigar industry has enjoyed increasing popularity and growing sales for at least the last two decades. According to the latest data, there are about 13 million cigar smokers in the U.S., and yearly U.S. cigar sales have increased over $8 billion. As such, the growth of the cigar industry has been accompanied by an explosion of various different types, sizes, and flavors of cigars. From large hand-rolled cigars and smaller machine-made cigars to little cigars that are similar in size to cigarettes, there are thousands of different cigar brands and types of cigars commercially available for cigar aficionados. Cigars can also vary greatly in price, from less expensive cigars that cost less than $1 to premium, handmade cigars that range in price from $6 to $30. Consequently, the large variety of items available to the cigar enthusiast can be intimidating to tackle, especially for new entrants to the cigar hobby.

One of the problems that arises for cigar aficionados or novices in the pursuit of the cigar hobby is the ability to distinguish between the large number of brands and types of cigars that are available. Various handbooks exist for cigar enthusiasts to identify or locate certain cigars, but these handbooks can be cumbersome to utilize and become outdated very quickly. Consequently, the cigar aficionado or novice must engage in time consuming research to identify or find a cigar of choice. This increases the time and resources necessary to engage in the cigar hobby. Another problem exhibited by cigar aficionados or novices is the ability to keep track of the different cigars he or she experiences, so as to keep a record of the experience associated with each cigar smoked, thereby honing one's tastes in order to become a connoisseur of cigars. Typically, a cigar aficionado will keep a notebook detailing the experience associated with each cigar smoked. These notebooks, however, can be unwieldy and difficult to use to organize one's notes on cigars. Consequently, many cigar aficionados and novices must rely on shear memory to log their cigar experiences and then recall them at a later time when necessary.

Therefore, a need exists for improvements over the prior art, and more particularly for methods and systems that facilitate the identification and exploration of cigars, as well as the process of logging experiences with cigars.

SUMMARY

A method and system that facilitates identification of a cigar is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method on a computer for facilitating identification of a cigar is provided that solves the above-described problems. The method is configured for: storing, in an attached database, a plurality of cigar records, wherein each cigar record defines the following data for a cigar: number of bands on the cigar, cigar band image for each band on the cigar, cigar band location for each band on the cigar, and cigar brand, reading an image of a particular cigar, identifying a number of bands in the image of the particular cigar, identifying a cigar band location for each band in the image of the particular cigar, extracting a separate cigar band image for each band in the image of the particular cigar, comparing the number of bands in the image of the particular cigar, the cigar band location for each band in the image of the particular cigar, and the cigar band image for each band in the image of the particular cigar to the data in the plurality of cigar records, so as to find a match between data of the particular cigar and data in one or more matching cigar records of the plurality of cigar records, wherein the one or more matching cigar records possess the same cigar brand, and reading the cigar brand from the one or more matching cigar records, so as to identify a cigar brand of the particular cigar

BRIEF DESCRIPTION OF THE DRAWINGS

The accompanying drawings, which are incorporated in and constitute a part of this disclosure, illustrate various example embodiments. In the drawings:

FIG. 2 is a diagram showing the data flow of the process for facilitating identification of a cigar, according to an example embodiment;

FIG. 3A is a flow chart of a method for facilitating identification of a cigar, according to an example embodiment;

DETAILED DESCRIPTION

Figure 1:
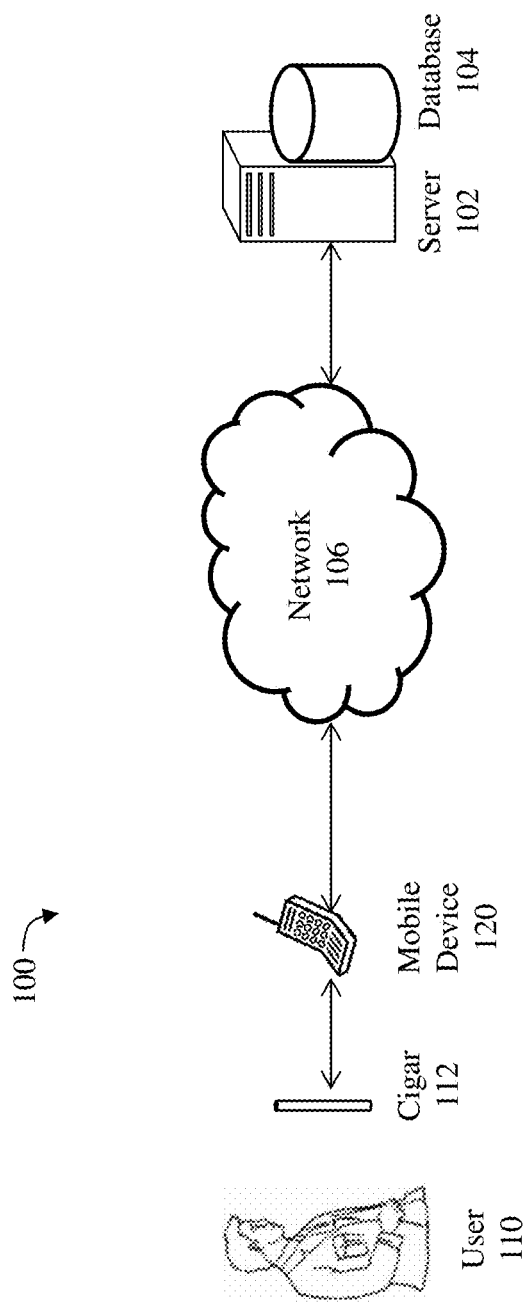
FIG. 1 is a block diagram of an operating environment that supports a process for facilitating identification of a cigar, according to an example embodiment.

The following detailed description refers to the accompanying drawings. Wherever possible, the same reference numbers are used in the drawings and the following description to refer to the same or similar elements. While embodiments of the claimed subject matter may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing systems and methods that allow for automated identification of a cigar and automated logging of experiences associated with each cigar. The claimed subject matter allows cigar aficionados and novices to quickly and efficiently identify a cigar simply by taking a photo of the cigar. This eliminates or reduces the need for a user to enter or type in the brand, line and type of cigar into an application or mobile computing device. The claimed subject matter further utilizes an image comparison method that yields highly accurate and precise matching to existing cigar data. The image comparison or image recognition process can be located on a server (i.e., in the cloud) which allows for expeditious updating of the recognition algorithm and of new cigar data without requiring updates to mobile applications that interact with the server process. Lastly, the claimed subject matter allows cigar aficionados and novices to quickly and easily upload and store (for later recall) experience data associated with a smoked cigar.

FIG. 1 is a block diagram of an operating environment 100 that supports a process for automated identification of a cigar on a local computer or on a server communicatively coupled with a communications network, according to an example embodiment. The environment 100 may comprise at least one mobile computing device 120 and a server 102 communicating via a communications network 106. The at least one mobile computing device 120 may be connected either wirelessly or in a wired or fiber optic form to the communications network 106. The environment 100 may further comprise at least a cigar 112 that may be imaged by the mobile computing device 120. Communications network 106 may be a packet switched network, such as the Internet, or any local area network, wide area network, enterprise private network, cellular network, phone network, mobile communications network, or any combination of the above.

The mobile computing device 120 and serer 102 may comprise a computing device 600, described below in greater detail with respect to FIG. 6. Further, mobile computing device 120 and server 120 may comprise mobile computing devices such as cellular telephones, smart phones or tablet computers, or other computing devices such as a desktop computer, laptop, game console, for example. In one embodiment, the mobile computing device 120 may be a conventional, off-the-shelf smart phone that has been integrated with a camera function.

Server 102 includes a software engine that delivers applications, data, program code and other information to networked devices, such as 120. The software engine of server 102 may perform other processes such as transferring multimedia data in a stream of packets that are interpreted and rendered by a software application as the packets arrive. It should be noted that although FIG. 1 shows only server 102 and one mobile computing device 120, the system of the claimed subject matter supports any number of servers and mobile computing devices connected via network 106. Server 102 and mobile computing device 120 may each include program logic comprising computer source code, scripting language code or interpreted language code that perform various functions of the claimed subject matter. In one embodiment, the aforementioned program logic may comprise program module 607 in FIG. 6.

FIG. 1 further shows that server 102 includes a database or repository 104, which may be a relational database comprising a Structured Query Language (SQL) database stored in a SQL server. Mobile computing device 120 may also include databases. The database 104 may serve data used by server 102, and mobile computing device 120, during the course of operation of the claimed process.

Environment 100 may be used when a mobile computing device 120 is used to take an image of cigar 112, which is then uploaded to database 104 coupled to server 102, which, in turn, executes image recognition processes on said image of the cigar. Alternatively, the image recognition process may occur on the device 120. Various types of data may be stored in the database 104 of server 102 or the database of computer 120. For example, said database may store a user record for each user 110.

A user record may include: contact/identifying information for the user (name, address, telephone number(s), email address, etc.), information pertaining to cigars attributed to the user, electronic payment information for the user, information pertaining to cigar purchases made by the user, etc. A user record may also include a unique identifier for each user, a residential address for each user, the current location of each user (based on location-based services from the user's mobile computer), experience data associated with each cigar experienced by the user and a description of past cigars purchased by each user. Experience data relates to textual, image and/or audio/video notes generated by the user that describes the user's experience with a cigar, such as a textual note that states: "This was a masterfully handcrafted cigar with a superb tobacco flavor and a hint of citrus." Experience data may also include an image of the cigar, taken by the user, and a time/date stamp. A user record may further include demographic data for each user, such as age, sex, income data, race, color, marital status, etc.

Figure 4A:
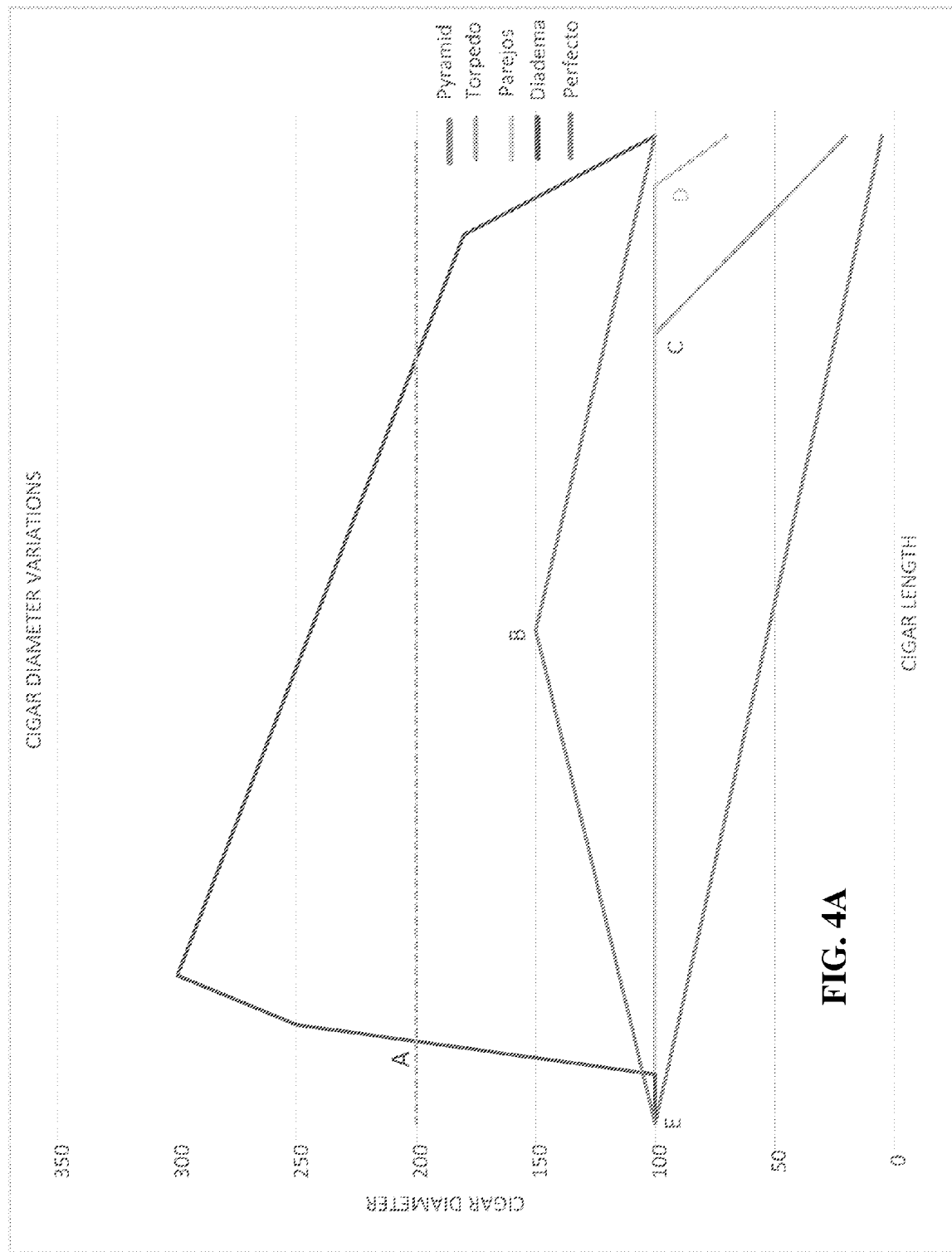
FIG. 4A is an illustration of a chart used for showing the variation in the diameter of a cigar along its length, according to an example embodiment.

Said database may also include a cigar record for each cigar. A cigar record may include the three main categories for identifying a particular cigar: the cigar brand (i.e., the brand that identifies the cigar maker that makes the cigar), the cigar line (i.e., the particular model of cigar made by the cigar maker) and cigar shape (i.e., the particular shape of the cigar line, such as figurado, parejo, torpedo, etc. —see FIG. 4C for a description of various cigar shapes). A cigar record may also include the following data for a cigar: presence of cigar tube, cigar wrapper color (see FIG. 4D for a description of various cigar wrapper colors), cigar bands, number of cigar bands, one or more cigar band images, one or more cigar band locations, an image of the cigar, and cigar shape ratio. Cigar tubes are containers used to store cigars and can be made of plastic or metal. The cigar wrapper is the outside layer of tobacco and gives a cigar one of its primary flavor components. A cigar band is a loop made of paper or foil fitted around the body of a cigar to denote its brand or variety. The cigar band may be in the middle of the cigar, at the bottom of the cigar (called the foot) or at the top of the cigar (called the head). A cigar band image is an image solely of the cigar band. Cigars come in a variety of shapes, such as parejos (straight sided cigars), figurados (non-straight sided) and perfectos (having bulges in the middle of the cigar). A cigar shape ratio of a particular cigar is calculated by dividing the length by the diameter of the cigar.

A cigar record may include the following data for a cigar: UPC code, barcode, identifying text, model name, type name, tube presence, tube type, number of cigar bands, cigar tube ratio (length of tube divided by cigar tube ring gauge), cigar ring gauge (i.t., thickness or girth of cigar). A cigar record may also include the type of tobacco used in the cigar, the manufacturer of the cigar and the country of origin of the cigar.

Note that although server 102 is shown as a single and independent entity, in one embodiment of the claimed subject matter, the functions of server 102 may be integrated with another entity, such as the mobile computing device 120. Further, server 102 and its functionality, according to a preferred embodiment, can be realized in a centralized fashion in one computer system or in a distributed fashion wherein different elements are spread across several interconnected computer systems.

Figure 3B:
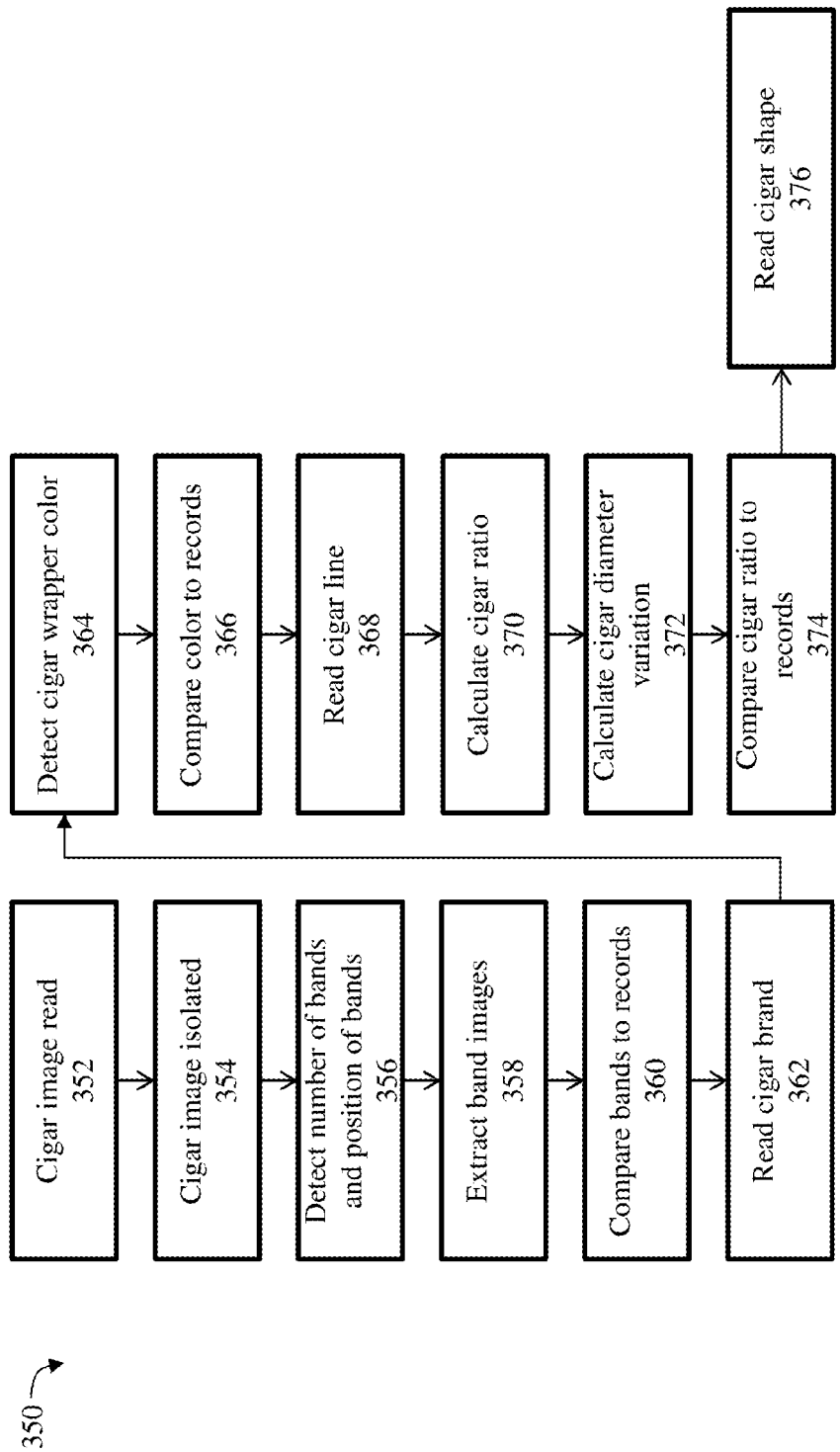
FIG. 3B is a flow chart of an image recognition process used in identifying a cigar, according to an example embodiment.

FIG. 3A is a flow chart of a method 300 for facilitating automated identification of a cigar on a server 102 communicatively coupled with the communications network 106, according to an example embodiment. Method 300 describes the steps that occur when a user 110 utilizes his or her mobile computing device 120 to attempt automated identification of a cigar. The method 300 is described with reference to FIG. 2, which is a diagram 200 showing the data flow of the process, as well as FIG. 3B, which defines the entire identification/recognition process, as well as FIGS. 4A-4D and 5, which describes graphical user interfaces utilized in the above process.

In one optional step, prior to the beginning of method 300, the user 110 may utilize his device 120 to create an account either on the server 102 or on device 120, or both. This optional step results in the creation of a user record for the user 110, wherein the user record is populated with the data for a user record defined above, wherein the user 110 enters said data into his device 120. In another optional step, prior to the beginning of method 300, an internal or external entity or node creates a plurality of cigar records 220 and stores them either in database 104, wherein each cigar record is populated with the data for a cigar record defined above.

Subsequently, method 300 starts with step 304, the user takes an image 204 of the cigar 112 using his device 120 (or accesses image 204 from storage, such as a library of stored images) and may upload the image 204 to the server 102 via network 106 (such as via an HTTP request). Note that image 204 comprises an image or photograph taken by the user with his device 120, which includes an optical sensor or a camera. The image 204 may then be stored in association with the user record of the user 110 and/or in association with the cigar record that is later found to correspond to said cigar 112.

Next, in step 306, either the server 102 executes an image recognition process on the image 204 to identify the cigar in the image 204. The result of step 306, is that server 102 identifies at least one cigar record or identifies a cigar brand, cigar line and/or cigar shape (collectively referred to as the cigar data 214) for a cigar that matches the cigar in image 204. Said cigar data 214 or a link thereto, may then be stored in association with the user record associated with user 110. The details of the image recognition process of step 306 is described in greater detail below with reference to method 350 in FIG. 3B. Next, in step 308, the cigar data 214, or a link thereto, is transmitted to the device 120 via network 106 (such as via an HTTP request). Said cigar identifying data 214 may be displayed for the user by device 120 (see description of FIG. 5 below). In step 310, the user 110 enters his experience data 206 into his device 120 and said data is transmitted to the server 102 via the network 106. Then, in step 312 said cigar identifying data 214 and experience data 206 are stored in association with the user record of the user 110 and/or in association with the matching cigar record that corresponds to said cigar 112.

FIG. 3B is a flow chart of an image recognition process used in identifying a cigar, according to an example embodiment. FIG. 3B provides more detail about the step 306 in FIG. 3A above. The method 350 of FIG. 3B begins with step 352 wherein the image 204 is read by server 102 from device 120 via network 106. In step 354, the server 102 isolates the image of the cigar from the background. Step 354 may be performed using known image processing techniques, such as background subtraction, also known as foreground detection, which is a technique in the fields of image processing and computer vision wherein an image's foreground is extracted for further processing (object recognition etc.). Generally an image's regions of interest are objects (humans, cars, text etc.) in its foreground. After the stage of image preprocessing (which may include image de-noising, post processing like morphology, etc.) object localization is required which may make use of this technique. Background subtraction is a widely used approach for detecting moving objects in videos from static cameras.

Next, in step 356, the server 102 identifies a number of cigar bands in the image 204 (i.e., the number of cigar bands on the cigar) and the cigar band location of each said band on the cigar. Step 356 may be performed known image processing techniques, such as object recognition, which is a task (within computer vision) of finding and identifying objects in an image or video sequence. Various well-known object recognition techniques may be used, such as edge detection, primal sketch, appearance based methods, edge matching, divide and conquer search, greyscale matching, gradient matching, histograms of receptive field responses, large model-bases, and feature based methods, such as interpretation trees, etc.

Next, in step 358, the server 102 extracts a separate image for each band identified in the cigar. Then, in step 360, the server 102 compares the number of cigar bands calculated above, the cigar band locations calculated above for each identified band and the cigar band images extracted above with the data in the cigar records in the attached database. The purpose of the comparison is to find one or more cigar records with data that matches the number of cigar bands calculated above, the cigar band locations calculated above for each identified band and the cigar band images extracted above. The one or more matching cigar records would possess the same cigar brand. In step 362, the cigar brand is read from the one or more matching cigar records, thereby identifying the cigar brand of the cigar 112 in image 204.

In one alternative to step 360, the server 102 may transmit, to the mobile computing device 120 over the communications network 106, cigar band images from a plurality of cigar records, so as to allow the user to select a cigar band image that most closely resembles a band on the particular cigar 112 (and wherein the selected cigar band image is transmitted back to the server 102). This alternative step would result in the cigar band image being recognized by the user.

Then, in step 364, the server 102 detects the cigar wrapper color in the image 204. Step 364 may be performed by reading the color associated with one or more pixels in the area of the cigar wrapper of the image 204. Alternatively, step 364 may be performed by calculating an average pixel color in a portion of the image 204 that covers the area of the cigar wrapper of the image 204. Step 364 may also be completed by comparing the average pixel color to a standard chart of wrapper color, which will result in identifying the main color of the wrapper. In one alternative, step 364 may include comparing the average pixel color for the particular cigar to a chart of cigar wrapper colors (see FIG. 4D) to determine the cigar wrapper color of the particular cigar.

Then, in step 366, the server 102 compares the cigar wrapper color calculated above with the data in the one or more matching cigar records identified in step 360 above. Note the comparison process of step 366 compares the color data only to the cigar records identified in step 360 above; not to the entire database of cigar records. The purpose of the comparison is to find cigar records with data that matches the cigar wrapper color identified above. The resulting matching cigar records would possess the same cigar line. In step 368, the cigar line is read from the matching cigar records, thereby identifying the cigar line of the cigar 112 in image 204.

Figure 4B:
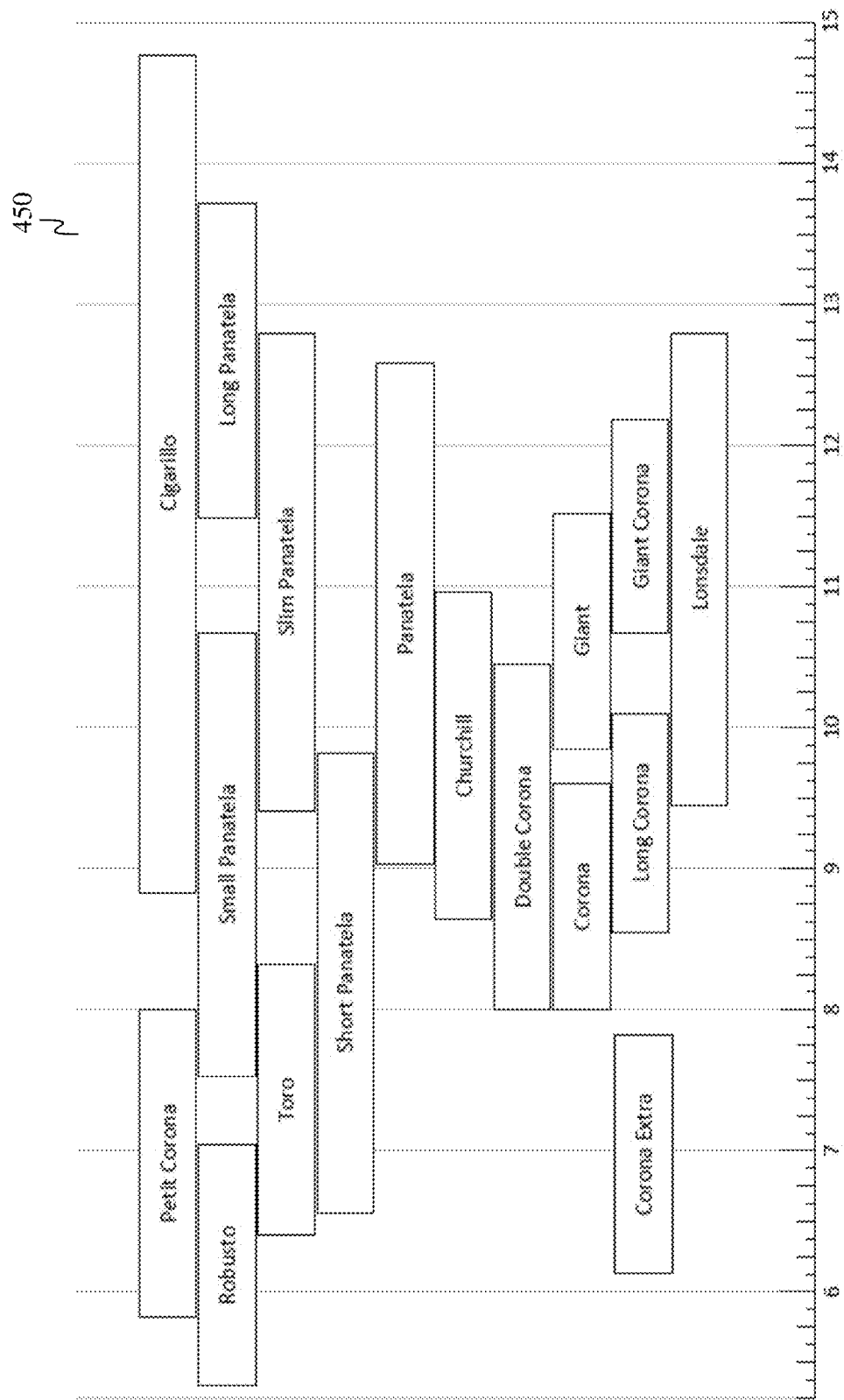
FIG. 4B is an illustration of a chart used for showing the cigar ratio of different cigar shapes, according to an example embodiment.
Figure 4C:
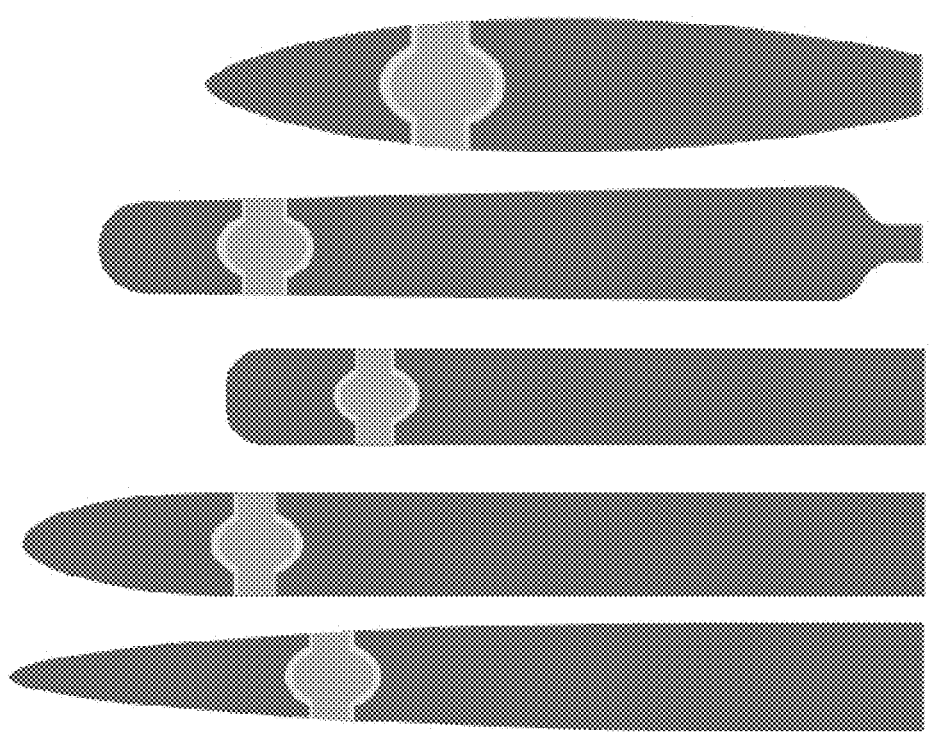
FIG. 4C is an illustration showing different cigar shapes, according to an example embodiment.
Figure 4D:
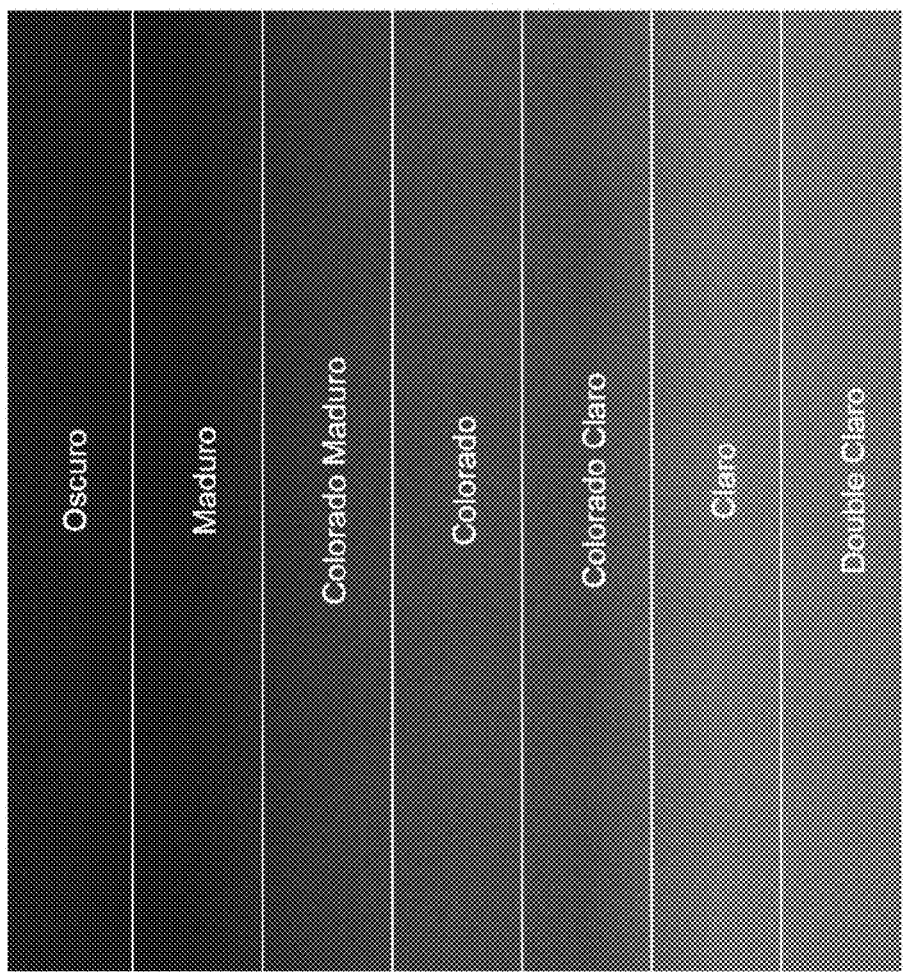
FIG. 4D is an illustration showing different cigar wrapper colors, according to an example embodiment.

Next, in step 370, the server 102 calculates a cigar ratio for the particular cigar by calculating a largest width of the particular cigar 112 in the image 204, calculating a length of the particular cigar in the image and dividing the calculated width by the calculated length. In one alternative, the device 120 or server 102 may compare the cigar ratio of the particular cigar 112 in the image 204 to a chart stored in memory, so as to determine the shape of the cigar 112 based on said comparison to each chart. The chart 450 of FIG. 4B provides an example of said chart, which displays the range of cigar ratios of each cigar shape along the x-axis. Thus, for each cigar shape, the cigar ratio range is shown in the chart. The chart 450 shows a line for a variety of cigar shapes, including panatela, Churchill, giant, etc.

Then, in step 372, the server 102 calculates a variation of the cigar diameter along the length of the particular cigar 112 in the image 204 by executing the following step at periodic intervals along a length of the particular cigar in the image 204: calculating a width or diameter of the cigar. This produces a group of cigar diameter values at various points along the length of the cigar in the image 204. In one alternative, the server 102 may compare the variation of the cigar diameter along the length of the particular cigar 112 in the image 204 to a chart stored in memory that shows said variation for each type of shape—e.g., figurado, regular round etc. . . . —so as to determine the shape of the cigar 112 based on said comparison to the chart. The chart 400 of FIG. 4A provides an example of said chart, which displays the cigar length along the x-axis and the diameter of the cigar along the y-axis. Thus, as one follows a line for a particular cigar, the y-value of the line may vary up and down, as the diameter of the cigar varies along the length of the cigar. The chart 400 shows a line for a variety of cigar shapes, including pyramid, perfecto, torpedo, etc.

Next, in step 374, the server 102 compares the cigar ratio for the particular cigar 112 and the cigar diameter along the length of the particular cigar 112 to the data in the group of matching cigar records identified in step 366 above. Note the comparison process of step 374 compares the cigar ratio and diameter data only to the cigar records identified in step 374 above; not to the entire database of cigar records. Thus, the result of step 374 is the identification of a match between the cigar ratio and variation of cigar diameter along the length of the particular cigar and data in one or more matching cigar records. The purpose of the comparison of step 374 is to find one or more cigar records with data that matches the cigar ratio and diameter data identified above. The matching cigar records would possess the same cigar shape. In step 376, the cigar shape is read from the one or more resulting matching cigar records, thereby identifying the cigar shape of the cigar 112 in image 204.

In one optional step, the server 102 calculates a cigar ring gauge, which may be performed by providing the user with a display of a ruler (in actual size on the display of device 120) so to allow the user to place the cigar 112 on the display screen, measure its gauge, and then enter the gauge that most closely fits the cigar 112. The gauge data may be transmitted to the server 102 via network 106. This information may be used by server 102 to find one or more cigar records with data that matches the cigar gauge data identified above (in the comparison processes of steps 360, 366 or 374 above).

Figure 5:
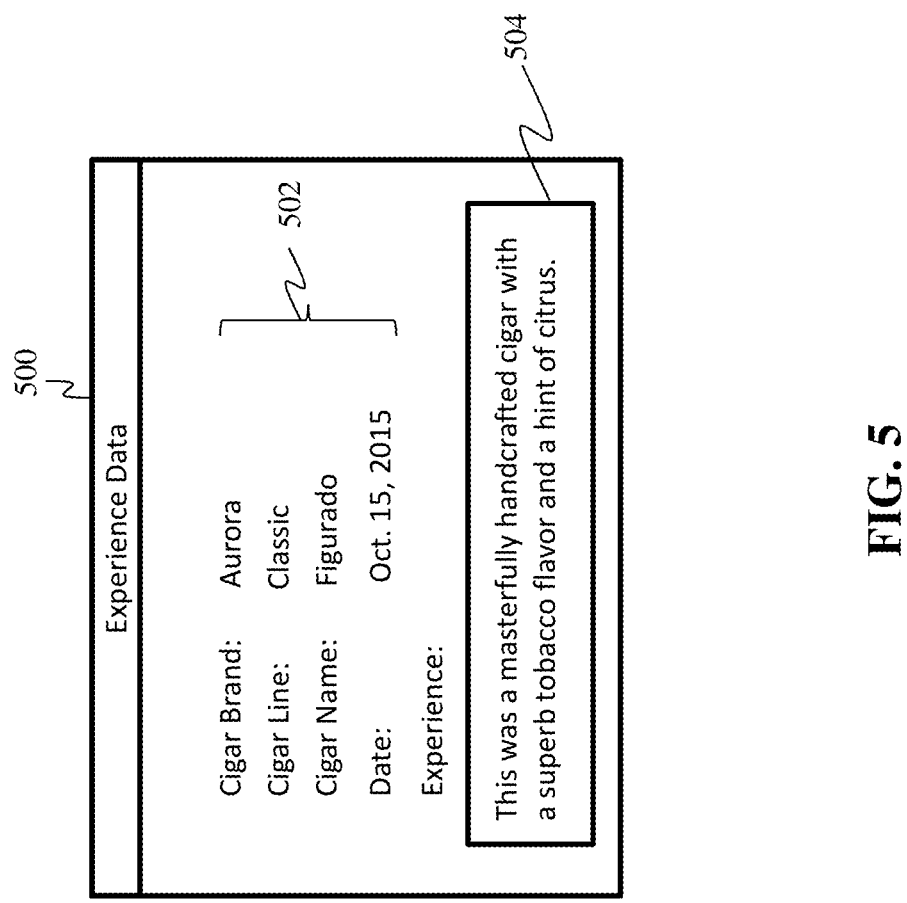
FIG. 5 is an illustration of a graphical user interface displayed for a user during the cigar experience solicitation process, according to an example embodiment.

FIG. 5 is an illustration of a graphical user interface 500 displayed for the user 110 during the cigar experience solicitation process, according to an example embodiment. The interface 500 shows the image that may be displayed as the user 110 handles his device 120 to enter his cigar experience data 206 of the cigar 112. The interface 500 may display cigar data 502 (which may correspond to the cigar data identifying 214 described above), and a text field 504, which allows the user 110 to enter experience data 206 relating to textual notes generated by the user that describes the user's experience with the cigar 112.

In one embodiment, the interface 500 allows the user to rate (such as using a star system), review and comment on the cigar 112. In another embodiment, in response to the user's review of the cigar 112, the server 102 searches and finds cigar brands or cigar lines that are recommended to the user, and said suggested cigar lines and brands may be transmitted to device 120 via network 106 and displayed on interface 500. Said suggestions or recommendations may be based on an analysis of the tobacco used in the cigar 112, or the manufacturer or country of origin of the cigar 112. Said suggestions or recommendations may also be based on an analysis of similar brands and lines that have been reviewed similarly by other users that also reviewed the cigar 112 similarly to the manner in which the user reviewed cigar 112 (i.e., other cigars with experience data from other users, wherein the experience data is similar to the experience data provided by the user for the cigar 112). Said suggestions or recommendations may also be based on the top scanned cigar brands or cigar lines, representing the most popular cigar brands or lines. Said suggestions or recommendations may also be based on the top reviewed cigar brands or cigar lines, representing the best cigar brands or lines.

Figure 6:
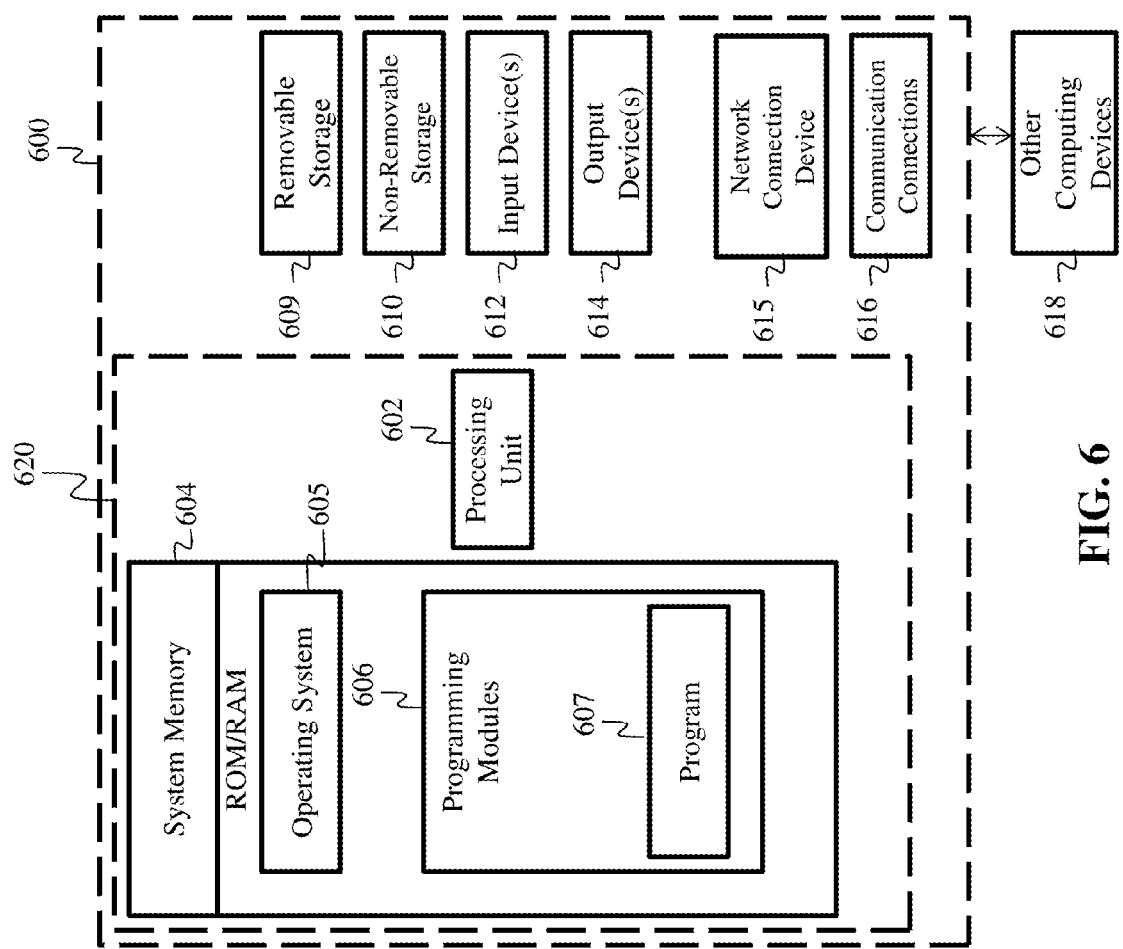
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by server 102, and/or device 120 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for methods 300, 350 as described above. Methods 300, 350 may operate in other environments and is not limited to computing device 600.

With reference to FIG. 6, a system consistent with an embodiment may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of device 120 and/or server 102. Furthermore, embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of methods 300's, 350's stages as described above. The aforementioned processes are examples, and processing unit 602 may perform other processes. Other programming modules that may be used in accordance with embodiments may include electronic mail and contacts applications, word processing applications, spreadsheet applications, database applications, slide presentation applications, drawing or computer-aided application programs, etc.

Generally, consistent with the embodiments, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, are described above with reference to block diagrams and/or operational illustrations of methods, systems, and computer program products according to embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, including a communications network, for facilitating identification of a cigar, the system comprising:
    a mobile computing device communicatively coupled with the communications network, the mobile computing device configured for:
        reading an image of a particular cigar;
        transmitting the image over the communications network;
        receiving a cigar brand and cigar line of the particular cigar over the communications network; and
        displaying the cigar brand and cigar line of the particular cigar for a user;
    a server communicatively coupled with the communications network, the server configured for:
        storing, in an attached database, a plurality of cigar records, wherein each cigar record defines the following data for a cigar: number of bands on the cigar, cigar band image for each band on the cigar, cigar band location for each band on the cigar, cigar wrapper color, cigar brand and cigar line;
        receiving, from the mobile computing device over the communications network, the image of the particular cigar;
        identifying a number of bands in the image of the particular cigar;
        identifying a cigar band location for each band in the image of the particular cigar;
        extracting a separate cigar band image for each band in the image of the particular cigar;
        comparing the number of bands in the image of the particular cigar, the cigar band location for each band in the image of the particular cigar, and the cigar band image for each band in the image of the particular cigar to the data in the plurality of cigar records, so as to find a match between data of the particular cigar and data in one or more first matching cigar records of the plurality of cigar records, wherein the one or more first matching cigar records possess the same cigar brand;
        reading the cigar brand from the one or more first matching cigar records, so as to identify a cigar brand of the particular cigar;
        identifying a portion of the image of the particular cigar corresponding to a tobacco portion of the particular cigar;
        calculating an average pixel color for the portion of the image, so as to calculate a cigar wrapper color for the particular cigar;
        comparing the cigar wrapper color for the particular cigar to the data in the one or more first matching cigar records, so as to find a match between the cigar wrapper color of the particular cigar and data in one or more second matching cigar records of the one or more first matching cigar records, wherein the one or more second matching cigar records possess the same cigar line;
        reading the cigar line from the one or more second matching cigar records, so as to identify a cigar line of the particular cigar; and
        transmitting the cigar brand and cigar line of the particular cigar over the communications network to the mobile computing device.

2. The system of claim 1, further comprising:
    receiving, from the mobile computing device over the communications network, experience data for the particular cigar from the user; and
    storing in a user record, in the attached database, the experience data for the particular cigar.

3. The system of claim 2, wherein the server is further configured for:
    transmitting, to the mobile computing device over the communications network, cigar band images from a plurality of cigar records, so as to allow the user to select a cigar band image that most closely resembles a band on the particular cigar.

4. The system of claim 3, wherein the server is further configured for:
    identifying one or more cigar records, in the plurality of cigar records, with cigar data that matches the type of tobacco used in the particular cigar, the manufacturer of the particular cigar and the country of origin of the particular cigar; and
    transmitting, to the mobile computing device over the communications network, cigar data from the one or more cigar records identified.

5. The system of claim 4, wherein the server is further configured for:
    identifying one or more cigar records, in the plurality of cigar records, having experience data from other users, wherein the experience data is similar to the experience data provided by the user for the particular cigar; and
    transmitting, to the mobile computing device over the communications network, cigar data from the one or more cigar records identified.

6. The system of claim 5, wherein the step of calculating an average pixel color for the portion of the image, so as to calculate a cigar wrapper color for the particular cigar further comprises comparing the average pixel color for the particular cigar to a chart of cigar wrapper colors to determine the cigar wrapper color of the particular cigar.

7. A system, including a communications network, for facilitating identification of a cigar, the system comprising:
    a mobile computing device communicatively coupled with the communications network, the mobile computing device configured for:
        reading an image of a particular cigar;
        transmitting the image over the communications network;
        receiving a cigar brand, cigar line and cigar shape of the particular cigar over the communications network; and
        displaying the cigar brand, cigar line and cigar shape of the particular cigar for a user;
    a server communicatively coupled with the communications network, the server configured for:
        storing, in an attached database, a plurality of cigar records, wherein each cigar record defines the following data for a cigar: number of bands on the cigar, cigar band image for each band on the cigar, cigar band location for each band on the cigar, cigar wrapper color, cigar brand and cigar line;

receiving, from the mobile computing device over the communications network, the image of the particular cigar;

identifying a number of bands in the image of the particular cigar;

identifying a cigar band location for each band in the image of the particular cigar;

extracting a separate cigar band image for each band in the image of the particular cigar;

comparing the number of bands in the image of the particular cigar, the cigar band location for each band in the image of the particular cigar, and the cigar band image for each band in the image of the particular cigar to the data in the plurality of cigar records, so as to find a match between data of the particular cigar and data in one or more first matching cigar records of the plurality of cigar records, wherein the one or more first matching cigar records possess the same cigar brand;

reading the cigar brand from the one or more first matching cigar records, so as to identify a cigar brand of the particular cigar;

identifying a portion of the image of the particular cigar corresponding to a tobacco portion of the particular cigar;

calculating an average pixel color for the portion of the image, so as to calculate a cigar wrapper color for the particular cigar;

comparing the cigar wrapper color for the particular cigar to the data in the one or more first matching cigar records, so as to find a match between the cigar wrapper color of the particular cigar and data in one or more second matching cigar records of the one or more first matching cigar records, wherein the one or more second matching cigar records possess the same cigar line;

reading the cigar line from the one or more second matching cigar records, so as to identify a cigar line of the particular cigar calculating a cigar ratio for the particular cigar by calculating a width of the particular cigar in the image, calculating a length of the particular cigar in the image and dividing the width by the length;

calculating a variation of cigar width along the length of the particular cigar in the image by calculating a width of the particular cigar in the image at periodic intervals along a length of the particular cigar in the image;

comparing the cigar ratio for the particular cigar and the variation of cigar width along the length of the particular cigar to the data in the one or more second matching cigar records, so as to find a match between the cigar ratio and variation of cigar width along the length of the particular cigar and data in one or more third matching cigar records of the one or more second matching cigar records, wherein the one or more third matching cigar records possess the same cigar shape;

reading the cigar shape from the one or more third matching cigar records, so as to identify a cigar shape of the particular cigar; and transmitting the cigar brand, cigar line and cigar shape of the particular cigar over the communications network to the mobile computing device.

8. The system of claim 7, further comprising:

receiving, from the mobile computing device over the communications network, experience data for the particular cigar from the user; and storing in a user record, in the attached database, the experience data for the particular cigar.

9. The system of claim 8, wherein the server is further configured for:

transmitting, to the mobile computing device over the communications network, cigar band images from a plurality of cigar records, so as to allow the user to select a cigar band image that most closely resembles a band on the particular cigar.

10. The system of claim 9, wherein the server is further configured for:

identifying one or more cigar records, in the plurality of cigar records, with cigar data that matches the type of tobacco used in the particular cigar, the manufacturer of the particular cigar and the country of origin of the particular cigar; and transmitting, to the mobile computing device over the communications network, cigar data from the one or more cigar records identified.

11. The system of claim 8, wherein the server is further configured for:

identifying one or more cigar records, in the plurality of cigar records, having experience data from other users, wherein the experience data is similar to the experience data provided by the user for the particular cigar; and transmitting, to the mobile computing device over the communications network, cigar data from the one or more cigar records identified.

12. The system of claim 8, wherein the step of calculating an average pixel color for the portion of the image, so as to calculate a cigar wrapper color for the particular cigar further comprises comparing the average pixel color for the particular cigar to a chart of cigar wrapper colors to determine the cigar wrapper color of the particular cigar.

13. The system of claim 8, wherein the mobile computing device is further configured for:

calculating a cigar gauge of the particular cigar in the image by providing an image of a ruler to the user for measuring the ring gauge of the cigar.

14. The system of claim 13, wherein the server is further configured for:

comparing the cigar gauge for the particular cigar to the data in the one or more second matching cigar records, so as to find a match between the cigar gauge of the particular cigar and data in one or more third matching cigar records of the one or more second matching cigar records.

* * * * *